(12) United States Patent
Dwyer

(10) Patent No.: US 7,640,082 B2
(45) Date of Patent: Dec. 29, 2009

(54) SYSTEM AND METHOD FOR DISTRIBUTIVELY DISPLAYING TERMINAL PROCEDURE DATA

(75) Inventor: David B. Dwyer, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/429,506

(22) Filed: May 5, 2006

(65) Prior Publication Data

US 2007/0260364 A1 Nov. 8, 2007

(51) Int. Cl.
*G01C 23/00* (2006.01)

(52) U.S. Cl. .............................. 701/3; 701/14; 340/945

(58) Field of Classification Search ...................... 701/9, 701/3, 14, 29, 30; 340/973, 204, 205, 945, 340/951; 345/204, 205
See application file for complete search history.

(56) References Cited

U.S. PATENT DOCUMENTS

| | | | | |
|---|---|---|---|---|
| 4,827,419 | A * | 5/1989 | Selby, III | 701/200 |
| 5,978,715 | A | 11/1999 | Briffe et al. | |
| 6,064,922 | A * | 5/2000 | Lee | 701/3 |
| 6,112,141 | A | 8/2000 | Briffe et al. | |
| 6,405,107 | B1 | 6/2002 | Derman | |
| 6,587,075 | B1 | 7/2003 | Loh et al. | |
| 6,633,801 | B1 * | 10/2003 | Durlacher et al. | 701/9 |
| 6,664,945 | B1 | 12/2003 | Gyde et al. | |
| 6,832,152 | B1 * | 12/2004 | Bull et al. | 701/200 |
| 6,999,026 | B2 | 2/2006 | Loh et al. | |
| 2005/0231390 | A1 * | 10/2005 | Crane et al. | 340/945 |

OTHER PUBLICATIONS

EP Search Report, EP 07107507.1 dated Oct. 13, 2008.

* cited by examiner

*Primary Examiner*—Mark Hellner
(74) *Attorney, Agent, or Firm*—Ingrassia Fisher & Lorenz, P.C.

(57) ABSTRACT

A display system and method for an aircraft selectively distributes and displays terminal procedure data. The system includes a processor and a display device. The processor is adapted to receive terminal procedure data representative of an airport terminal procedure that is normally illustrated on a terminal procedure chart and is operable, upon receipt of the terminal procedure data, to supply terminal procedure image rendering display commands. Each of the plurality of flight deck display devices is coupled to receive selected ones of the terminal procedure image rendering display commands and is operable, in response thereto, to render a terminal procedure image representative of a portion of the airport terminal procedure that is normally illustrated on the terminal procedure chart.

17 Claims, 8 Drawing Sheets

FIG. 6

(SJN3.SJN) 03247          SL-322 (FAA)          PHOENIX SKY HARBOR INTL (PHX)
ST. JOHNS THREE DEPARTURE                    PHOENIX, ARIZONA

DEPARTURE ROUTE DESCRIPTION

<u>TAKE-OFF RUNWAY 8:</u> Climb via 078° heading to 1550 then climbing right turn heading 080°, at 4 DME east of PXR VORTAC, climbing left turn heading 045° to PXR R-054 to SJN VORTAC, maintain 7000. Thence. . . .

<u>TAKE-OF RUNWAY 7L:</u> Climb via 078° heading to 1550, then climbing left turn heading 075°, at 4 DME east of PXR VORTAC, climbing left turn heading 045° to PXR R-054 to SJN VORTAC, maintain 7000. Thence. . . .

<u>TAKE-OFF RUNWAY 7R:</u> Climb via 078° heading to 1550, then climbing left turn heading 070°, at 4 DME east of PXR VORTAC, climbing left turn heading 045° to PXR R-054 to SJN VORTAC, maintain 7000. Thence. . . .

<u>TAKE-OFF RUNWAY 25R/26:</u> Climb via 258° heading to 1550, then climbing right turn heading 260°, at 9 DME west of PXR VORTAC, climbing right turn heading 360°, maintain 7000. Expect radar vectors to PXR R-054 to SJN VORTAC. Thence. . . .

<u>TAKEOFF RUNWAY 25L:</u> Climb via 258° heading to 1550, then climbing right turn heading 265°, at 9 DME west of PXR VORTAC, climbing right turn heading 360°, maintain 7000. Expect radar vectors to PXR R-054 to SJN VORTAC. Thence. . . .

. . . .via asssigned transition. Expect filed altitude 3 minutes after departure.

<u>ALBUQUERQUE TRANSITION (SJN3.ABQ):</u> From over SJN VORTAC via SJN R-059 and ABQ R-240 to ABQ VORTAC.

TAKEOFF NOTES CONT.

<u>TAKE-OFF OBSTACLES</u>

NOTE: Rwy 7L, building 1298' from departure end of runway, 798' left of centerline, 67' AGL/1176' MSL.

NOTE: Rwy 7R, rod 717' from departure end of runway, 184' right of centerline, 87' AGL/1196' MSL.

NOTE: Rwy 8, light standard 3460' from departure end of runway, 1207' left of centerline, 123' AGL/1232' MSL.
Rwy 8, light standard 3444' from departure end of runway, 1003' left of centerline, 118' AGL/1227' MSL.

NOTE: Rwy 25L, light standard 271' from departure end of runway, 5140' left of centerline, 91' AGL/1200' MSL NOTE: Rwy 26, light 59' from departure end of runway, 63' right of centerline, 16' AGL/1125' MSL.
Rwy 26, pole 58' from departure end of runway, 90' right of centerline, 25' AGL/1125' MSL.
Rwy 26, light 78' from departure end of runway, 64' right of centerline, 18' AGL/1127' MSL.
Rwy 26, tree 38' from departure end of runway, 440' right of centerline, 24' AGL/1133' MSL.
Rwy 26, light standard 77' from departure end of runway, 453' right of centerline, 27' AGL/1136' MSL.
Rwy 26, light standard 74' from departure end of runway, 453' right of centerline, 33' AGL/1140' MSL
Rwy 26, light standard 77' from departure end of runway, 434' right of centerline, 31' AGL/1142' MSL
Rwy 26, light 38' from departure end of runway, 440' right of centerline, 26' AGL/1135' MSL.
Rwy 26, tree 113' from departure end of runway, 294' left of centerline, 24' AGL/1133' MSL.
Rwy 26, building, 13789' from departure end of runway, 3309' right of centerline, 406' AGL/1496' MSL
Rwy 26, building 13530' from departure end of runway, 3631' right of centerline, 663' AGL/1750' MSL

ST. JOHNS THREE DEPARTURE                    PHOENIX, ARIZONA
(SJN3.SJN) 03247                         PHOENIX SKY HARBOR INTL (PHX)

FIG. 7

SYSTEM AND METHOD FOR DISTRIBUTIVELY DISPLAYING TERMINAL PROCEDURE DATA

TECHNICAL FIELD

The present invention relates to a vehicle display system and method and, more particularly, to a system and method for distributively displaying terminal procedure data that is typically provided on terminal procedure publication charts.

BACKGROUND

Aircraft egress from, and aircraft ingress to, airports is conducted in accordance with so-called terminal procedures. As is generally known, the terminal procedures for each airport generally include one or more arrival procedures, one or more approach procedures, and one or more departure procedures. As is also generally known, arrival procedures are used to move an aircraft from its enroute airspace to a terminal airspace for landing, approach procedures are used to move an aircraft from a terminal airspace to a specific runway for landing, and departure procedures are used to move an aircraft from a terminal airspace to enroute airspace. Each of these terminal procedures includes various types of information such as, for example, communication frequencies, lateral fix information, and vertical fix information.

The terminal procedures are published as charts, using textual, graphical, and iconic formats, by governments and, in some instances, by various companies. For example, in the United States (U.S.), Jeppesen publishes terminal procedures. The terminal procedures are typically published as printed paper books. For example, the terminal procedures covering airports in the U.S., Puerto Rico, Virgin Islands, and Pacific Territories, are published by the U.S. government as a 26 volume set of printed books known as the U.S. Terminal Procedures Publication (TPP). The TPP provides various types of arrival, approach, and departure procedures for each airport in this coverage area, including Instrument Approach Procedure (IAP) charts, Departure Procedure (DP) charts, Standard Terminal Arrival (STAR) charts, Charted Visual Flight Procedures (CVFP), and Airport Diagrams (AD).

The published terminal procedures, or at least portions thereof, are carried onboard each aircraft for use by the flight crews. Established rules and regulations mandate that the terminal procedures at least be available to the aircraft flight crew when conducting an arrival, approach, or departure procedure. Typically, before conducting one of these procedures, the flight crew may open the appropriate volume to the appropriate procedure to extract the procedure information therefrom, and then implement the procedure. This can be a time consuming and laborious task for the flight crew.

More recently, the terminal procedures discussed above are being published electronically, in an effort to move toward a so-called "paperless flight deck." The electronic versions of the terminal procedures, when displayed on an electronic display device, provide exact replicas of the paper versions of the procedures. The electronic display device that is used to display the electronic terminal procedures may use an existing display that is already integrated into the flight deck, or a separate, stand-alone display device, known as an "electronic flight bag."

Although the use of electronic terminal procedures may eliminate the need to carry the paper versions onboard an aircraft, it does present drawbacks of its own. In particular, recent testing has shown that electronic terminal procedure usage may not decrease flight crew workload as compared to paper terminal procedure usage, since the flight crew still functions as a data router. Moreover, testing has shown that electronic terminal procedure usage may actually increase flight crew workload as compared to paper terminal procedure usage. This potential workload increase results from the need for the flight crew to electronically search, scroll, and zoom the displayed electronic terminal procedure images.

Hence, there is a need for a system and method that displays terminal procedure data to aircraft flight crews that does not rely on the flight crew as a data router, and/or is less time consuming and laborious, and/or decreases flight crew workload. The present invention addresses one or more of these needs.

BRIEF SUMMARY

The present invention provides a system and method that distributively displays terminal procedure data to aircraft flight crews. In one embodiment, and by way of example only, a flight deck display system includes a processor and a display device. The processor is adapted to receive terminal procedure data representative of an airport terminal procedure that is normally illustrated on a terminal procedure chart and is operable, upon receipt of the terminal procedure data, to supply terminal procedure image rendering display commands. Each of the plurality of flight deck display devices is coupled to receive selected ones of the terminal procedure image rendering display commands and is operable, in response thereto, to render a terminal procedure image representative of a portion of the airport terminal procedure that is normally illustrated on the terminal procedure chart.

BRIEF DESCRIPTION OF THE DRAWINGS

The present invention will hereinafter be described in conjunction with the appended drawing figures, wherein like numerals denote like elements, and in which:

FIGS. 6 and 7 depict an exemplary departure procedure that is published by the U.S. Government;

DETAILED DESCRIPTION

Figure 1:
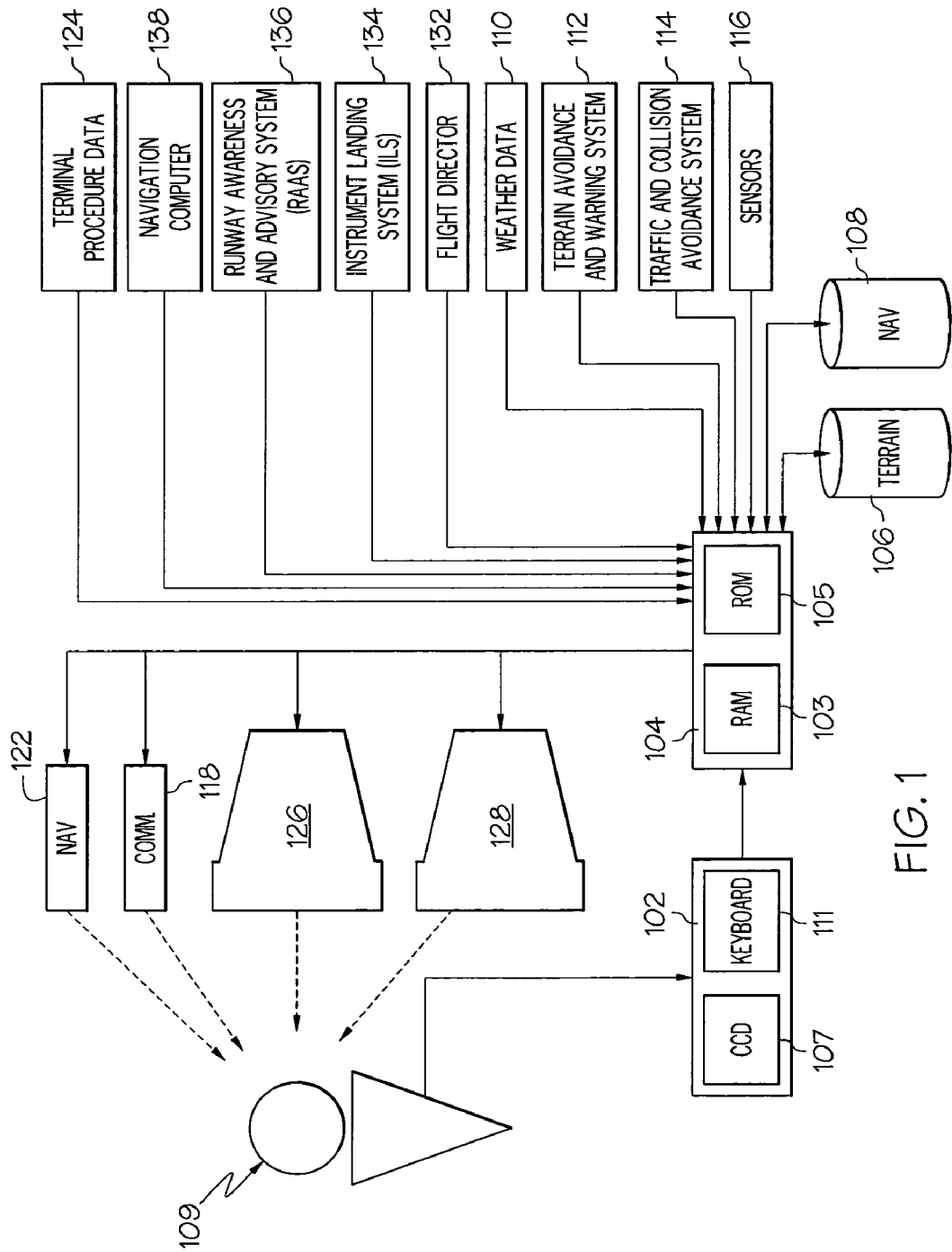
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, an exemplary flight deck display system 100 will be described. In the depicted embodiment, the system 100 includes a user interface 102, one or more processors 104, one or more terrain databases 106, one or more navigation databases 108, a source of weather data 110, a terrain avoidance and warning system (TAWS) 112, a traffic and collision avoidance system (TCAS) 114, various sensors 116, communication radios 118, navigation radios 122, a terminal procedure data source 124, and a plurality of display devices 126, 128. Before proceeding further, it will be appreciated that the depicted system 100 is merely exemplary, and that it could be implemented without one or more of the depicted components, systems, and data sources. It will additionally be appreciated that the system 100 could be implemented with one or more additional components, systems, or data sources, or receive inputs therefrom. Indeed, as is depicted, and will be further described below, the system 100 does receive inputs from various other external systems.

Returning now to a description of the system 100, the user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen, and may use the keyboard 111 to, among other things, input textual data.

The processor 104 is in operable communication with the terrain databases 106, the navigation databases 108, the radios 118, 122, the terminal procedure data source 124, and the display devices 126, 128, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to one or both the display devices 126, 128, so that the retrieved terrain and navigation data are appropriately displayed on one or both of the display devices 126, 128. As FIG. 1 additionally shows, the processor 104 is also in operable communication with the source of weather data 110, the TAWS 112, the TCAS 114, and is additionally configured to supply appropriate display commands to one or both of the display devices 126, 128 so that the avionics data, weather data 110, data from the TAWS 112, data from the TCAS 114, and data from the previously mentioned external systems may also be selectively displayed on one or both of the display devices 126, 128. Moreover, and as will be described further below, the processor 104 is further configured to selectively receive terminal procedure data from the terminal procedure data source 124, and to supply appropriate display commands to one or both of the display devices 126, 128 so that the terminal procedure data may be selectively displayed on or both of the display devices.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data representative of the terrain over which the aircraft may fly, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain databases 106 and navigation databases 108 could also be part of a device or system that is physically separate from the display system 100.

The avionics data that are supplied from the sensors 116 include data representative of the state of the aircraft such as, for example, aircraft speed, altitude, and heading. The weather data 108 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to one or both of the display devices 126, 128 such that a graphic representation of each aircraft in the vicinity is displayed thereon. The TAWS 112 supplies data representative of the location of terrain that may be a threat to the aircraft. The processor 104, in response to the TAWS data, preferably supplies appropriate display commands to the display devices 126, 128 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor 104 for display on the display devices 126, 128. In the depicted embodiment, these external systems include a flight director 132, an instrument landing system (ILS) 134, a runway awareness and advisory system (RAAS) 136, and a navigation computer 138. The flight director 132, as is generally known, supplies command data representative of commands for piloting the aircraft in response to flight crew entered data, or various inertial and avionics data received from external systems. The command data supplied by the flight director 132 may be supplied to the processor 104 and displayed on one or both of the display devices 126, 128 for use by the pilot 109, or the data may be supplied to an autopilot (not illustrated). The autopilot, in turn, produces appropriate control signals which are applied to the aircraft's flight control surfaces to cause the aircraft to fly in accordance with the flight crew entered data, or the inertial and avionics data.

The ILS 134 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 134 on board the aircraft receives these signals and supplies appropriate data to the processor for display of, for example, ILS lateral and vertical deviations (not illustrated in FIG. 1) on at least one of the display devices 126, 128. The ILS represents two signals, a localizer signal that is used to provide lateral guidance, and a glide slope signal that is used for vertical guidance.

The RAAS 136 provides improved situational awareness to help lower the probability of runway incursions by providing timely aural advisories to the flight crew during taxi, takeoff, final approach, landing and rollout. The RAAS 136 uses GPS data to determine aircraft position and compares aircraft position to airport location data stored in the navigation database 108. Based on these comparisons, the RAAS 136, if necessary, issues appropriate aural advisories. The aural advisories the RAAS 136 may issue inform the pilot 109, among other things of when the aircraft is approaching a runway—either on the ground or from the air—when the aircraft has entered and is aligned with a runway, when the runway is not long enough for the particular aircraft, the distance remaining to the end of the runway as the aircraft is landing or during a rejected takeoff, when the pilot 109 inadvertently begins to take off from a taxiway, and when an aircraft has been immobile on a runway for an extended time.

The navigation computer 138 is used, among other things, to allow the pilot 109 to program a flight plan from one destination to another. The navigation computer 138 may be in operable communication with the flight director 132. As was mentioned above, the flight director 132 may be used to automatically fly, or assist the pilot 109 in flying, the programmed route. The navigation computer 138 is in operable communication with various databases and data sources including, for example, the terrain database 106, the navigation database 108, and the terminal procedure data source 124. The processor 104 may receive the programmed flight plan data from the navigation computer 138 and cause programmed flight plan, or at least portions thereof, to be displayed on one or both of the display devices 126, 128.

The display devices 126, 128 are each used to display various images and data, in a graphic, iconic, and a textual format, and to supply visual feedback to the user 109 in response to user input commands supplied by the user 109 to the user interface 102. It will be appreciated that the display devices 126, 128 may each be implemented using any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display devices 126, 128 include a panel display. To provide a more complete description of the method that is implemented by the flight deck display system 100, a general description of each of the display devices 126, 128 and the information each displays will now be provided. Before doing so, however, it is noted that the system 100 could be implemented with more than two display devices 126, 128. For example, the system could be implemented with four display devices, two of one of the display devices 126, and two of the other display device 128. With this configuration, an aircraft pilot and co-pilot are each provided with the two display devices 126, 128.

Figure 2:
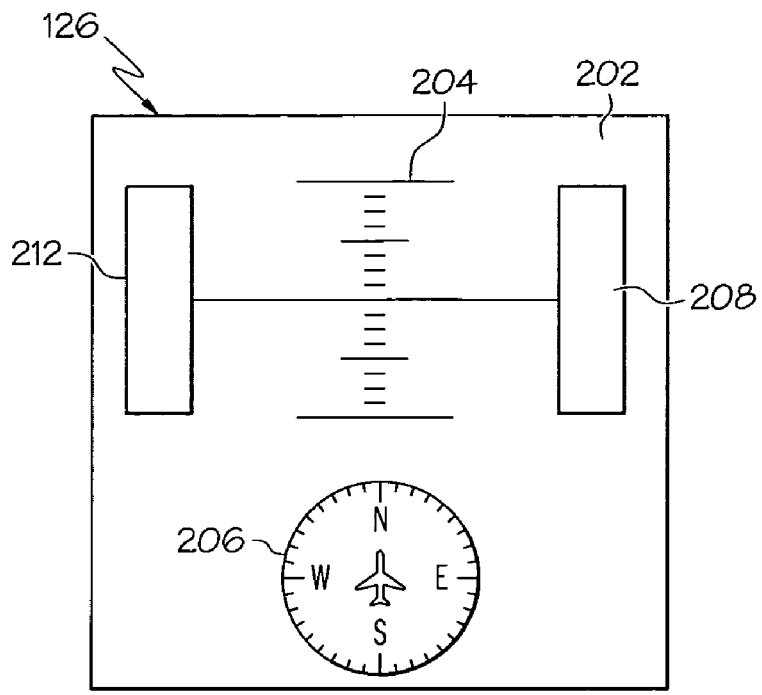
FIG. 2 a simplified representation of an exemplary primary flight display (PFD) display screen that may be used in the system of FIG. 1.

Turning now to a more description of the depicted display devices, one of the display devices 126 is preferably implemented as a primary flight display (PFD), and the other display device 128 is preferably implemented as a multi-function display (MFD). The PFD 126 is used to display various types of flight information in a display area 202. As depicted in simplified format in FIG. 2, the flight information that is displayed in the display area 202 typically includes, for example, a combined attitude direction indicator 204, a horizontal situation indicator 206, airspeed 208, and altitude 212, just to name a few. It will be appreciated that this information may be rendered on the PFD 126 in graphic, iconic, or textual formats, or various combinations thereof. Moreover, although not depicted in FIG. 2, it will be appreciated that the PFD 126 may display additional flight information. Examples of such additional flight information include, but are not limited to, vertical speed, certain engine information, and aircraft configuration information. It will be furthermore appreciated that, at least in some embodiments, the PFD 126 also graphically displays either a two-dimensional or perspective view of terrain ahead of the aircraft.

Figure 3:
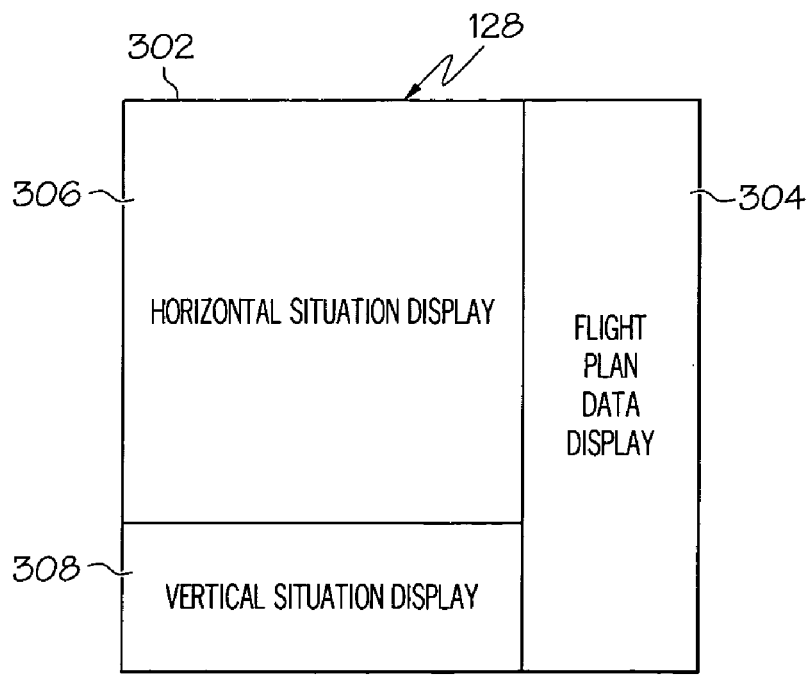
FIG. 3 is a simplified representation of an exemplary multi-function display (MFD) display screen that may be used in the system of FIG. 1, which shows the overall layout of the multi-function display screen, and on which various images may be simultaneously displayed.

The MFD 128 is used to display information that allows an aircraft flight crew to perform flight planning and/or aircraft system management, both before and during flight. In a particular preferred embodiment, the MFD 128 includes a display area in which multiple graphical, iconic, and/or textual images may be simultaneously displayed, preferably in different sections of its display area. For example, and as depicted in FIG. 3, the MFD 128 may display, in various sections of its display area 302, a flight-plan data display 304, a lateral situation display 306, and a vertical situation display 308, simultaneously, alone, or in various combinations. The flight-plan data display 304 provides a textual display of various types of data related to the flight plan of the aircraft.

Such data includes, but is not limited to, the flight identifier, route iteration number, a waypoint list and associated information, such as bearing and time to arrive, just to name a few. It will be appreciated that the flight-plan data display 304 may additionally display various types of data associated with various types of flight hazards. It will additionally be appreciated that the MFD 128 could be configured to selectively display only the flight-plan data display 304, the lateral situation display 306, or the vertical situation display 308, or various combinations thereof. Moreover, all or portions of the information displayed in the flight-plan data display 304, the lateral display 306, and/or the vertical situation display 306 could instead or additionally be displayed on one or more other non-illustrated display devices.

The lateral situation display 306 provides a two-dimensional lateral situation view of the aircraft along the current flight path, and the vertical situation display 308 provides either a two-dimensional profile vertical situation view or a perspective vertical situation view of the aircraft along the current flight path and/or ahead of the aircraft. While not depicted in FIG. 3, the lateral situation display 306 and the vertical situation display 308 may each selectively display various features including, for example, a top-view symbol and a side-view aircraft symbol, respectively, in addition to various symbols representative of the current flight plan, various navigation aids, and various map features below and/or ahead of the current flight path such as, for example, terrain, runways, and political boundaries. It will be appreciated that the lateral situation display 306 and the vertical situation display 308 preferably use the same scale so that the pilot can easily orient the present aircraft position to either section of the display area 302. It will additionally be appreciated that the processor 104 may implement any one of numerous types of image rendering methods to process the data it receives from the navigation databases 106, the navigation database 108, and/or the terminal procedure data source 124, to cause the display devices 126, 128 to render the views displayed therein.

In addition to the data, icons, and/or images delineated above, and as was previously mentioned, both the PFD 126 and the MFD 128 are also used to selectively and simultaneously display various terminal procedure data. Preferably, not all of the data that are presented on the currently published (both paper and electronic) terminal procedures will be displayed. Rather, only the data that a flight crew needs to actually conduct the terminal procedure will be displayed. The terminal procedure data that get displayed are supplied from the terminal procedure data source 124, and generally include communication data (e.g., communication frequencies), lateral fix data (e.g., headings, indents, radials, etc.), vertical fix data (altitudes, angles), missed approach data, various procedure-related minimum data (e.g., minimum airspeeds, minimum altitudes, etc.), and aircraft performance data (e.g., climb gradients, landing distances, etc.). The terminal procedure data that are displayed on these individual display devices 126, 128 will vary depending, for example, on the particular terminal procedure that is being (or will be) conducted, and on the particular data that are associated with the particular terminal procedure that is being (or will be) conducted.

Specifically, the terminal procedure data associated with the particular arrival, approach, or departure procedure that is being (or will be) conducted are selectively distributed for display on the PFD 126, the MFD 128, and/or one or more other displays, depending on the data type. More specifically, the terminal procedure data are selectively distributed for display on a display device that the aircraft flight crew will most likely find the particular data useful. As is shown more clearly in simplified form in FIG. 4, in a particular preferred embodiment, communication data 404 associated with a selected terminal procedure 402-1 are either displayed where radio tuning is performed by the flight crew (either the MFD 128 or the radios 118 themselves) or radio tuning is performed automatically, lateral fix data 406 are selectively displayed on both the PFD 126 and the MFD 128 (in the flight-plan data display 304 and the lateral situation display 306), vertical fix data 408 are selectively displayed on both the PFD 126 and the MFD 128 (in the vertical situation display 308), missed approach data 412 are selectively displayed on both the PFD 126 and the MFD 128 (in the flight-plan data display 304 and the lateral situation display 306), minimum data 414 are selectively displayed on the MFD 128 (in the flight-plan data display 304), and performance data 416 are selectively displayed on the PFD 126 and the MFD (in the flight-plan data display 304).

Before proceeding further, it should be appreciated that the above-described distribution is merely exemplary of a particular preferred embodiment, and that the terminal procedure data could be alternatively distributed to the various display devices. It is additionally noted that the specific display device on which specific terminal procedure data are rendered may vary. Thus, while the following description provides a specific implementation, and discusses selection of the specific display devices that are used to display specific terminal procedure data, it should be appreciated that this is merely exemplary. In this regard, although in the following description certain terminal procedure data are described herein as being displayed on, for example, the PFD 126, it will be appreciated that these data may alternatively be displayed on the MFD 128 or other display device, and vice-versa. It will additionally be appreciated that these data are preferably displayed at least substantially simultaneously, when needed or desired, with other data from the terrain databases 106, the navigation databases 108, weather data 110, TAWS 112 data, TCAS 114 data, ILS 134 data, and/or RAAS 136 data.

Returning once again to the description, it will be appreciated that the particular terminal procedure data that are selectively displayed on the display devices 126, 128 will vary with the particular terminal procedure being conducted (or about to be conducted). Thus, each of the different terminal procedures, the terminal procedure data associated therewith, and an exemplary distribution of the terminal procedure data for display on the display devices 126, 128 will be individually discussed, beginning with the departure procedure.

Figure 5:
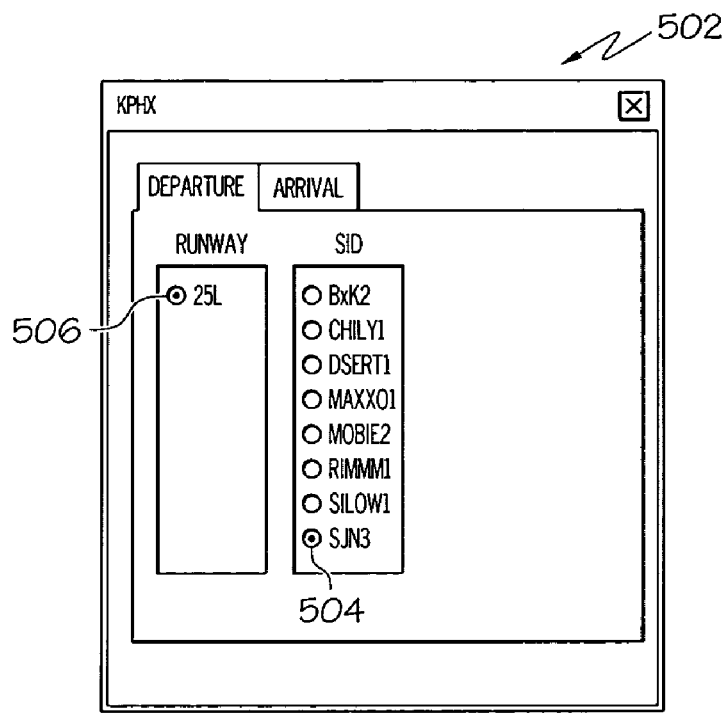
FIG. 5 is an exemplary representation of a drop down menu that may be displayed and used to select a departure procedure.
Figure 6:
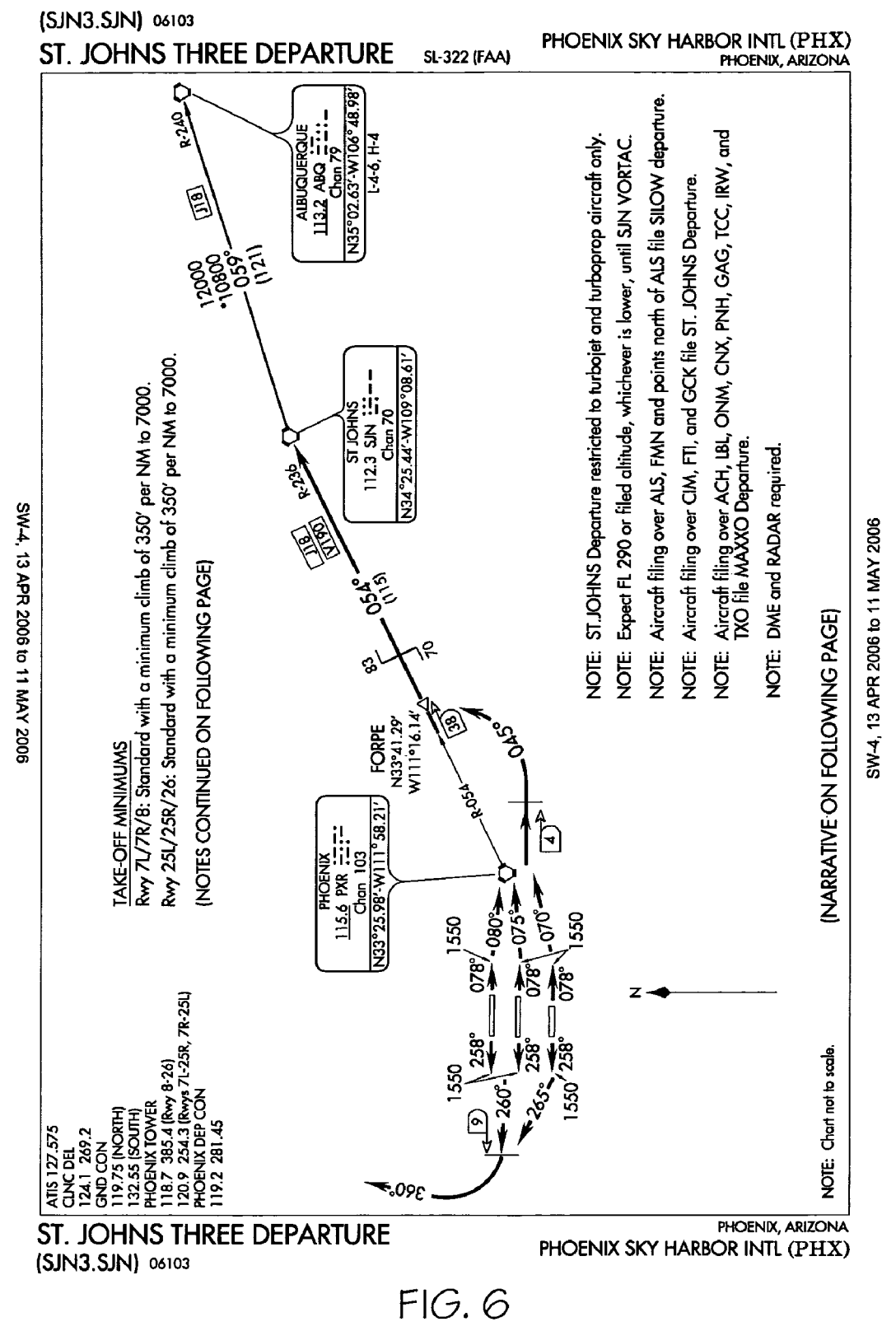

Prior to an aircraft leaving a gate or tarmac, the flight crew will select an appropriate departure procedure to conduct, and then conduct a departure briefing. This selection may take any one of numerous forms, and may be accomplished either graphically or textually. In a particular preferred embodiment, however, a drop down menu is displayed. The drop down menu 502, an exemplary embodiment of which is depicted in FIG. 5, supplies a selectable list of departure procedures associated with the airport from whence departure is taking place. The selectable departure procedures may include, as is generally known, both standard instrument departures (SIDs) and departure procedures (DPs). It will be appreciated that the selectable list may be displayed on either the PFD 126 or the MFD 128, but it is preferably displayed on the MFD 128. It will additionally be appreciated that the selectable list may be displayed in any one or more of the MFD display area sections 302-306. To select a particular procedure, the user 109 may move a cursor over the desired departure procedure using the CCD 107, and then select the procedure, also using the CCD 107. In the depicted embodiment, the departure airport is Sky Harbor International Airport in Phoenix, Ariz., and the selected departure procedure 504 is the St. Johns Three Departure for runaway 25L. For completeness, an embodiment of the procedure that is published by the U.S. Government is illustrated in FIGS. 6 and 7.

When the departure procedure 504 is selected, the processor 104 selectively retrieves, from the terminal procedure data source 124, the terminal procedure data associated with the selected departure procedure that the flight crew needs to conduct the departure briefing and the departure procedure. The processor 104, upon receipt of the terminal procedure data, supplies terminal procedure image rendering display commands to each of the display devices 126, 128. These image rendering display commands cause the display devices 126, 128 to render various textual, graphic, and/or iconic data. It should be noted that a departure briefing requires the flight crew to brief all aspects of aircraft departure. A typical departure briefing includes, for example, the type of take-off to be conducted (auto assisted or manual), the initial heading/course, initial altitude, airspeed limits, clearance limit, emergency return plan, standard operating procedure deviations, weather conditions, obstacle clearances, abort procedures, and call outs, just to name some of the information that is briefed. It will be appreciated that some of these data are not published on terminal procedure charts, while other of these data are published on the terminal procedure chart associated with the selected departure procedure 504. It is these latter data that are selectively displayed to the flight crew, on the display devices 126, 128, preferably during both the departure briefing and aircraft departure.

In a particular preferred embodiment, and consistent with the generalized discussion above, the terminal procedure image rendering display commands supplied to the PFD 126 cause the PFD 126 to render various graphic and/or iconic data associated with the selected departure procedure 504. These data are rendered to provide a lateral/vertical flight plan, which may include steering commands and the minimum climb gradient. It will be appreciated that some of these data could be rendered using icons, similar to the manner in which icons are presently used on approach terminal procedure charts for displaying missed approach procedures.

The terminal procedure image rendering display commands supplied to the MFD 128 preferably cause the MFD 128 to render various textual data in the flight-plan data display 304. These rendered textual data include a textual readout of the selected departure procedure, which may include, for example, the initial heading/course, and initial altitude. The rendered textual data also preferably includes any specific procedure-related minimum or performance data associated with the selected departure procedure such as, for example, altitude limits, airspeed limits, minimum climb gradients during take-off, and any potential obstacles, just to name a few. The terminal procedure image rendering display commands supplied to the MFD 128 additionally cause the MFD 128 to render textual, graphic, and/or iconic data in the lateral situation display 306 and the vertical situation display 308. In the lateral situation display 306, these data are rendered to provide a lateral view of the departure procedure path. In the vertical situation display 308, these data are rendered to provide a profile or perspective view of the departure procedure path, which may include the minimum climb gradient data associated therewith.

In addition to the above, the selected departure procedure will include various airport communication data including, for example, ATIS/AWOS frequencies, clearance delivery (CLNC DEL) frequency, and various ground or tower control communication frequencies. These communication data may be selectively displayed on either or both the PFD 126 and the MFD 128, on a separate display, or on the appropriate communication radio 118 itself. Alternatively, as was noted above, the processor 104 and radios 118 may be configured such that the processor 104 automatically tunes the appropriate radios 118 to the appropriate frequencies at the appropriate time.

It should be noted that the departure procedure is typically selected prior to the aircraft leaving the gate or tarmac. Thus, in some embodiments, the terminal procedure data associated with the selected departure procedure may be selectively displayed on the display devices 126, 128 while the aircraft is taxiing to its assigned departure runway and/or during the take-off roll. In an alternative embodiment, however, the system 100 is configured such that, during these phases of the departure, one or both of the display devices 126, 128 will render an image of the airport map (or at least portions thereof), along with an icon showing the present position of the aircraft. It will be appreciated that the system 100 could be configured to automatically switch between the display of the airport map and the terminal procedure data, or this functionality could be menu-driven and selectable by the flight crew.

Once the aircraft has completed the selected departure procedure 504 and has entered the enroute space, the system 100 will implement various known functions associated with this phase of flight. Again, it will be appreciated that the system 100 could be configured to automatically switch between the display of departure procedure data and enroute procedure data, or this functionality could be menu-driven and selectable by the flight crew. Nonetheless, since the enroute phase of flight does not use terminal procedures, a discussion thereof is not needed to fully describe or enable the instant invention. Therefore, no such description will be provided. However, when the aircraft nears its destination and will thus be leaving its enroute airspace, the flight crew selects and implements an arrival procedure to transition the aircraft from its enroute airspace to a terminal airspace for landing, and then an approach procedure to transition the aircraft from the terminal airspace to a specific runway. Hence, the terminal procedure data associated with these two terminal procedures that are selectively displayed on the display devices 126, 128 will now be described.

Figure 8:
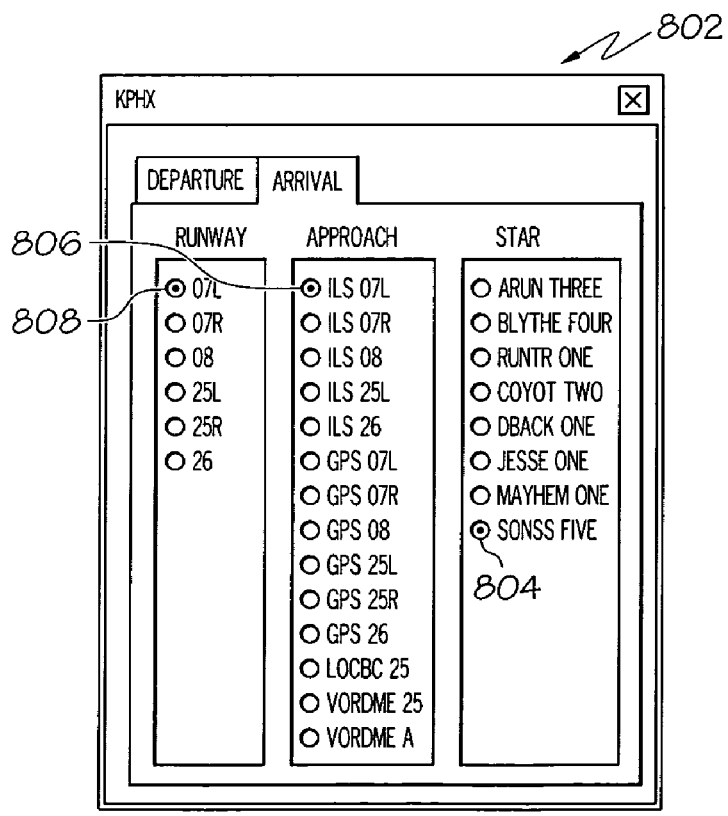
FIG. 8 is an exemplary representation of a drop down menu that may be displayed and used to select a arrival and approach procedures.
Figure 9:
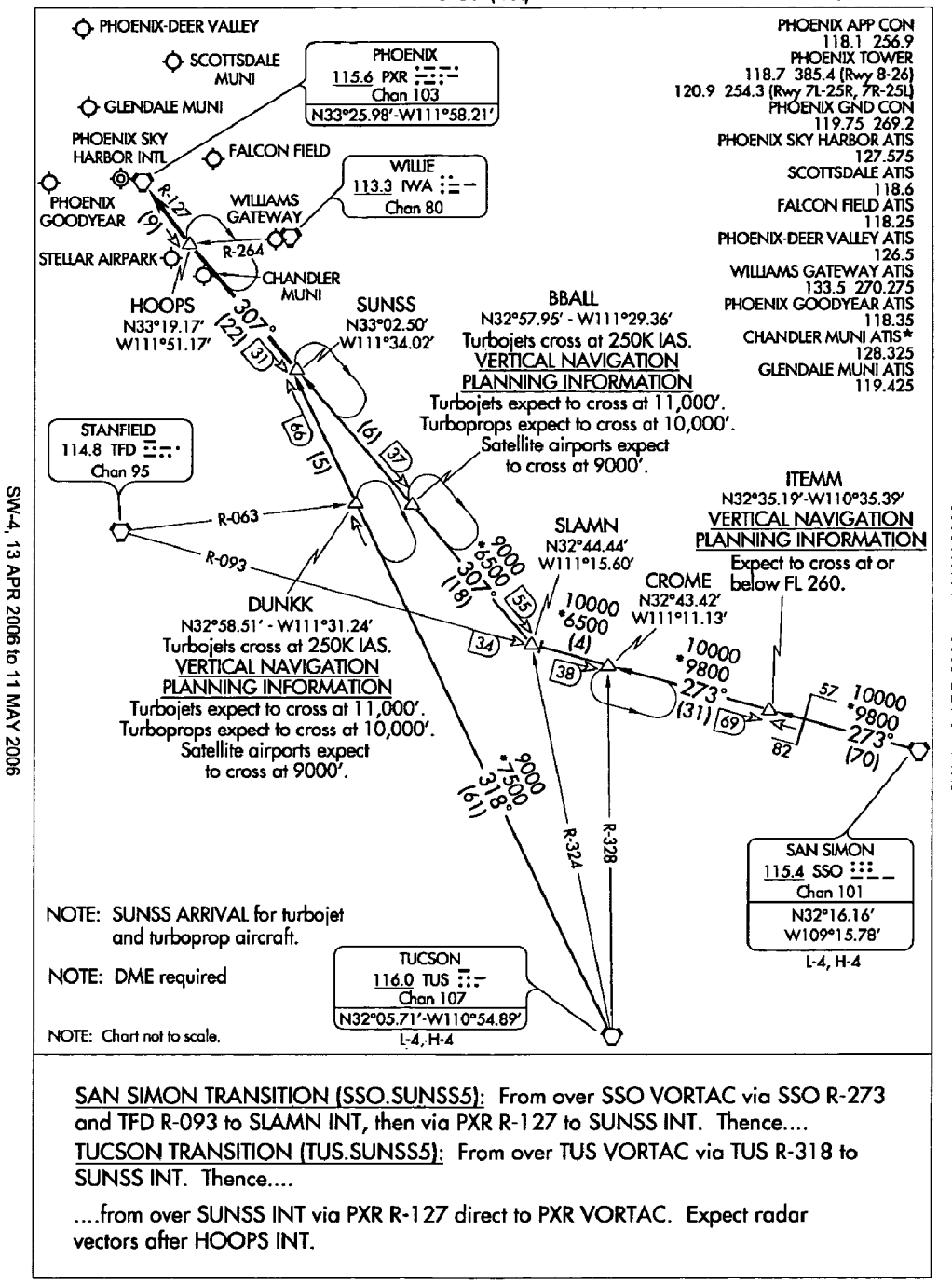
FIGS. 9-10 depict exemplary arrival and approach procedures, respectively, that are published by the U.S. Government.
Figure 10:
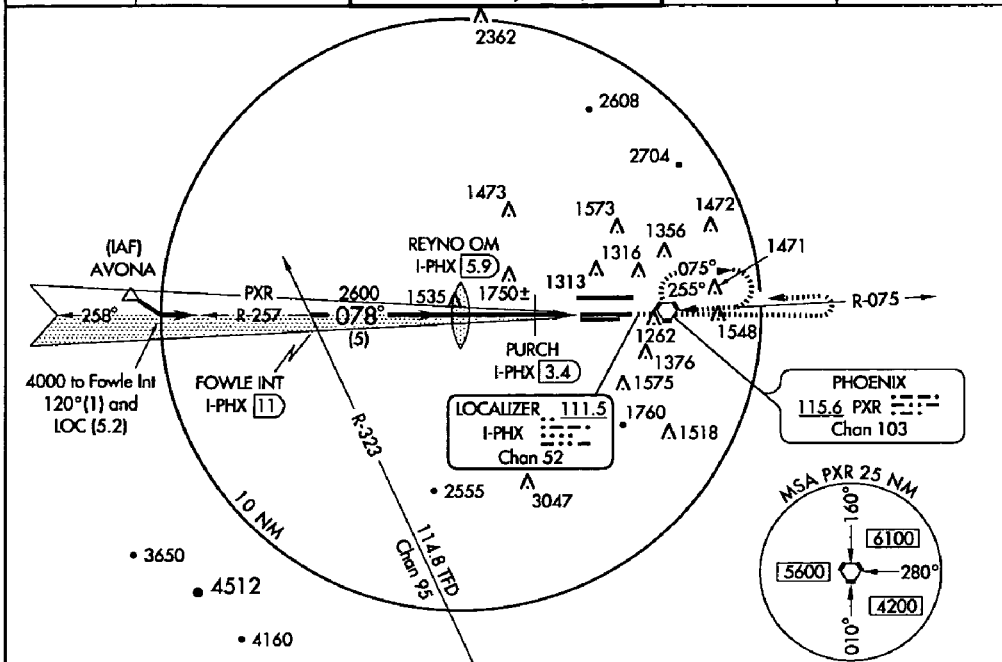

As an aircraft approaches the top-of-descent (TOD) of the enroute airspace, the flight crew prepares for landing at the destination. This preparation includes selection of appropriate arrival and approach procedures that will be conducted. It will be appreciated that these terminal procedures may be separately or simultaneously selected. In a preferred embodiment, however, the selection is made simultaneously. In addition, this selection may take any one of numerous forms, and may be accomplished either graphically or textually. In a particular preferred embodiment, however, the selection is implemented, similar to what is done for departure procedure selection, using a displayed drop down. The drop down menu 802, an exemplary embodiment of which is depicted in FIG. 8, supplies a selectable list of arrival and approach procedures associated with the destination airport. The selectable arrival and approach procedures may include, as is generally known, standard terminal arrival (STAR) procedures and charted visual flight procedures (CVFP). In the depicted embodiment, however, only STAR procedures are provided. It will be appreciated that the selectable list may be displayed on either the PFD 126 or the MFD 128, but it is preferably displayed on the MFD 128. It will additionally be appreciated that the selectable list may be displayed in any one or more of the MFD display area sections 302-306. To select a particular procedure, the user 109 may move a cursor over the desired departure procedure using the CCD 107, and then select the procedure, also using the CCD 107. In the depicted embodiment, the destination airport is Sky Harbor International Airport in Phoenix, Ariz., the selected arrival procedure 804 is the SUNSS Five Arrival, the selected approach procedure 806 is the ILS 07L, and the selected runway 808 is 07L. For completeness, embodiments of the procedures that are published by the U.S. Government are illustrated in FIGS. 9 and 10.

Before proceeding further, it is noted that in the following discussion the data associated with the selected arrival and approach procedures 804, 806 that are selectively displayed are described as being displayed at least substantially simultaneously displayed. It will be appreciated that this description is merely exemplary of one particular embodiment, and that the data associated with each of the selected procedures 804, 806 could be separately (e.g., non-simultaneously) displayed, or selected portions of each of the selected procedures 804, 806 could be simultaneously displayed. Moreover, if the data associated with each procedure 804, 806 are separately or selectively simultaneously displayed, it will be appreciated that both of these implementations could be conducted either manually, in response to user input, or automatically, based on phase-of-flight determination by the processor 104 or other external system.

With the above background in mind, when the arrival 804 and approach 806 procedures are selected, the processor 104 selectively receives, from the terminal procedure data source 124, the terminal procedure data associated with the selected arrival and approach procedures that the flight crew needs to conduct the selected arrival and approach procedures 804, 806 and the approach briefing. The processor 104, upon receipt of the terminal procedure data, supplies terminal procedure image rendering display commands to each of the display devices 126, 128. These image rendering display commands cause the display devices 126, 128 to render various textual, graphic, and/or iconic data. It should be noted that an approach briefing, similar to a departure briefing, requires the flight crew to brief all aspects of aircraft approach. A typical approach briefing includes, for example, the approach to be executed, field elevation, minimum altitudes, inbound leg to final approach fix, initial approach course heading and intercept altitude, decision altitude/minimum descent altitude, missed approach point, type of approach lights in use, missed approach procedures, and runway information conditions, just to name some of the data that are briefed. Similar to the departure briefing data described above, it will be appreciated that some of these data are not published on terminal procedure charts, while other of these data are published on the terminal procedure chart associated with the selected approach procedure 806. It is these latter data that are selectively displayed to the flight crew, on the display devices 126, 128, during both the approach briefing and aircraft approach.

Figure 4:
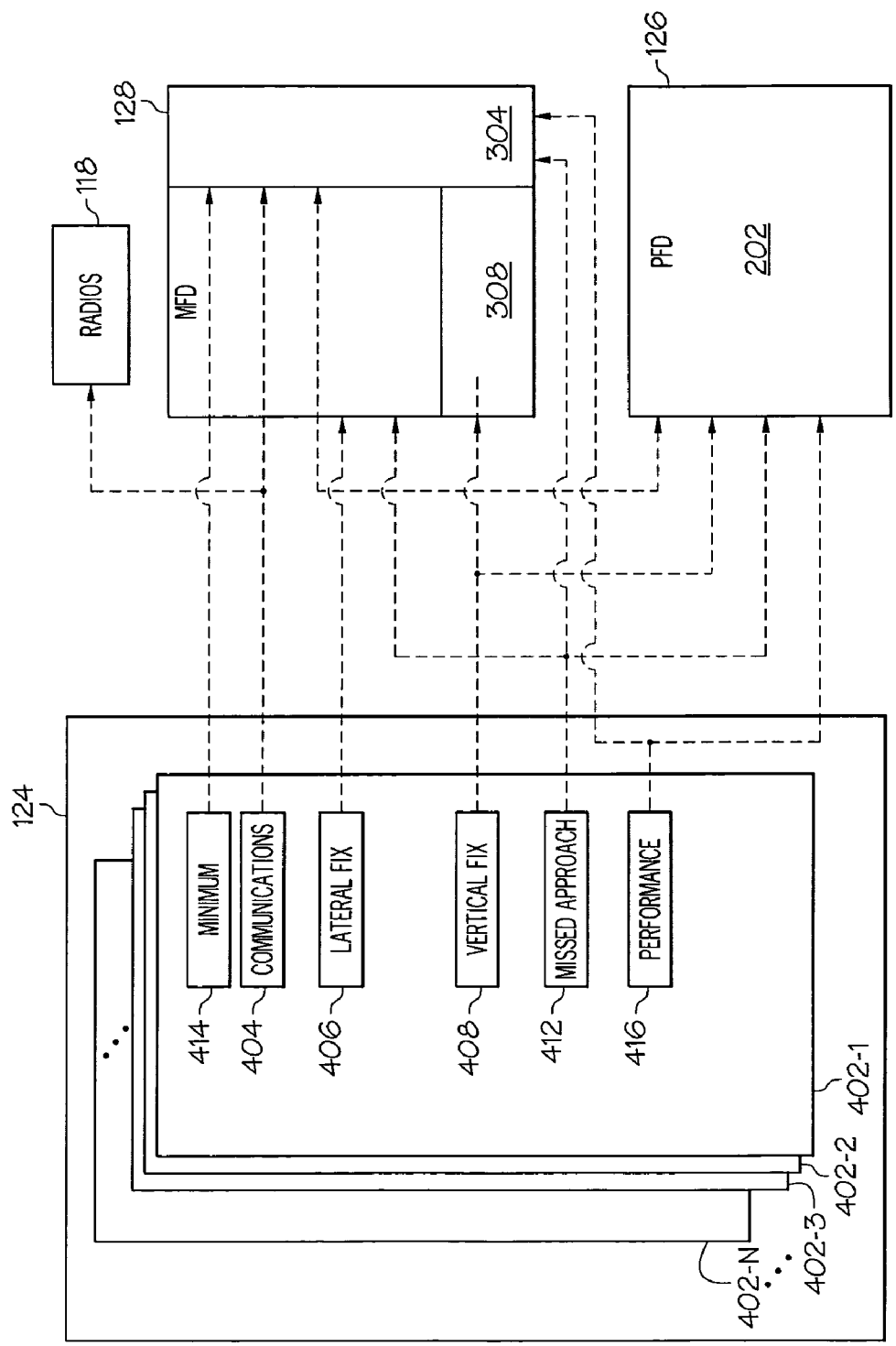
FIG. 4 is a simplified schematic representation depicting how various terminal procedure data are distributively displayed on the display devices depicted in FIG. 1.

In a particular preferred embodiment, and consistent with the general discussion previously provided and what is depicted in FIG. 4, the terminal procedure image rendering display commands supplied to the PFD 126 during arrival and approach procedure implementation cause the PFD 126 to render various graphic and/or iconic data associated with the selected arrival and/or approach procedures 804, 806 (including a missed approach). These data are rendered to provide a lateral/vertical flight plan, which may include steering commands and the minimum climb gradient. Again, similar to the displayed departure procedure data, it will be appreciated that some of these data could be rendered using icons, similar to the manner in which icons are presently used on approach terminal procedure charts for displaying missed approach procedures. Moreover, it will be appreciated that the actual missed approach icons that provide the missed approach procedure for the selected approach procedure 806 are preferably displayed on the PFD.

The terminal procedure image rendering display commands supplied to the MFD 128 preferably cause the MFD 128 to render various textual data in the flight-plan data display 304. These rendered textual data include a textual readout of the selected arrival and/or approach procedure (including the missed approach). The rendered textual data also preferably includes any specific minimum or performance data associated with the selected arrival and/or approach procedures such as, for example, altitude limits, airspeed limits, landing distances, and any potential obstacles, just to name a few. The terminal procedure image rendering display commands supplied to the MFD 128 additionally cause the MFD 128 to render textual, graphic, and/or iconic data in the lateral situation display 306 and the vertical situation display 308. In the lateral situation display 306, these data are rendered to provide a lateral view of the arrival and/or approach procedure paths. In the vertical situation display 308, these data are rendered to provide a profile or perspective view of the arrival and/or approach procedure paths, which may include the minimum climb gradient data associated therewith.

In addition to the above, the selected arrival and approach procedures 804, 806 will include various airport communication data including, for example, ATIS/AWOS frequencies, and various ground or tower control communication frequencies. These communication data may be selectively displayed on either or both the PFD 126 and the MFD 128, on a separate display, or on the appropriate communication radio 118 itself. Alternatively, as was noted above, the processor 104 and radios 118 may be configured such that the processor 104 automatically tunes the appropriate radios 118 to the appropriate frequencies at the appropriate time.

It should be noted that, in some embodiments, the terminal procedure data associated with the selected arrival and/or approach procedures may be selectively displayed on the display devices 126, 128 while the aircraft is landing on, and taxiing from, its assigned runway. In an alternative embodiment, however, the system 100 is configured such that, during these operations, one or both of the display devices 126, 128 will render an image of the destination airport map (or at least portions thereof), along with an icon showing the present position of the aircraft. It will be appreciated that the system 100 could be configured to automatically switch between the display of the airport map and the terminal procedure data, or this functionality could be menu-driven and selectable by the flight crew.

The system and method described herein provides an efficient and relatively less time consuming way for the displaying terminal procedure data to aircraft flight crews. The system and method alleviates the need for flight crews to act as data routers, and thus decreases flight crew workload.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A flight deck display system for an aircraft, comprising:
a processor adapted to receive terminal procedure data representative of an airport terminal procedure that is normally illustrated on a terminal procedure chart and operable, upon receipt of the terminal procedure data, to supply terminal procedure image rendering display commands; and
a multi-function display (MFD) and a primary flight display (PFD), the MFD and PFD each coupled to receive selected ones of the terminal procedure image rendering display commands and operable, in response thereto, to render terminal procedure images representative of only portions of the airport terminal procedure that are normally illustrated on the terminal procedure chart, wherein:
the terminal procedure data include at least lateral fix data, vertical fix data, and missed approach procedure data, and
at least portions of the lateral fix data, the vertical fix data, and the missed approach procedure data are displayed on one or both of the MFD and the PFD, at least the missed approach procedure data being rendered using icons similar to those on terminal procedure charts for displaying missed approach procedures.

2. The system of claim 1, further comprising:
one or more terminal procedure data sources in operable communication with the processor and configured to at least selectively supply the terminal procedure data.

3. The system of claim 2, wherein the one or more terminal procedure data sources comprise one or more databases having the terminal procedure data stored thereon.

4. The system of claim 1, wherein the terminal procedure images that are rendered include one or more of text, icon, and map images.

5. The system of claim 1, wherein the terminal procedure data include data representative of departure procedures, arrival procedures, and approach procedures.

6. The system of claim 1, wherein:
the terminal procedure data further include communication data; and
the communication data are displayed on one or both of the MFD and the PFD.

7. The system of claim 5, further comprising one or more communication radios, and wherein:
the terminal procedure data further include communication data; and
the communication data are displayed on the one or more radios.

8. The system of claim 7, wherein:
the communication data include information representative of one or more desired communication frequencies to which the one or more radios should be tuned;
the one or more radios are in operable communication with the processor; and
the processor is further operable, upon receipt of the communication data, to automatically tune the one or more radios to the desired one or more communication frequencies.

9. The system of claim 1, wherein:
the MFD is further operable, in response to commands supplied thereto from the processor, to selectively display a lateral map and a vertical situation display;
at least portions of the lateral fix data are displayed in the lateral map; and
at least portions of the vertical fix data are displayed in the vertical situation display.

10. The system of claim 1, wherein:
the terminal procedure data further include procedure-related minimum data; and
the procedure-related minimum data are displayed on one or both of the MFD and the PFD.

11. The system of claim 1, wherein:
the terminal procedure data further include aircraft performance data; and
the aircraft performance data are selectively displayed on one or both of the MFD and the PFD.

12. A flight deck display system for an aircraft, comprising:
one or more terminal procedure data sources configured to supply the terminal procedure data representative of an airport terminal procedure that is normally illustrated on a terminal procedure chart;
a processor adapted to selectively receive terminal procedure data from the terminal procedure data source and operable, upon receipt of the terminal procedure data, to supply terminal procedure image rendering display commands; and
a plurality of flight deck display devices, each flight deck display device coupled to receive selected ones of the terminal procedure image rendering display commands and operable, in response thereto, to render a terminal procedure images representative of portions of the airport terminal procedure that are normally illustrated on the terminal procedure chart, wherein:
the plurality of flight deck display devices include a multi-function display (MFD) and a primary flight display (PFD),
the terminal procedure data include at least lateral fix data, vertical fix data, and missed approach procedure data, and
at least portions of the lateral fix data, the vertical fix data, and the missed approach procedure data are displayed on one or both of the MFD and the PFD, at least the missed approach procedure data being rendered using icons similar to those on terminal procedure charts for displaying missed approach procedures.

13. The system of claim 12, wherein the one or more terminal procedure data sources comprise one or more databases having the terminal procedure data stored thereon.

14. The system of claim 12, wherein the terminal procedure image that is rendered includes one or more of text, icon, and map images.

15. The system of claim 12, wherein the terminal procedure data include data representative of departure procedures, arrival procedures, and approach procedures.

16. A method of displaying airport terminal procedure data, comprising the steps of:
processing terminal procedure data that are representative of an airport terminal procedure that is normally illustrated on a terminal procedure chart; and
selectively displaying, on a multi-function display (MFD) and a primary flight display (PFD), terminal procedure images representative of only portions of the airport terminal procedure that are normally illustrated on the terminal procedure chart,
wherein:
the terminal procedure data include at least lateral fix data, vertical fix data, and missed approach procedure data, and
at least portions of the lateral fix data, the vertical fix data, and the missed approach procedure data are displayed on one or both of the MFD and the PFD, at least the missed approach procedure data being rendered using icons similar to those on terminal procedure charts for displaying missed approach procedures.

17. The method of claim 16, further comprising:
selectively displaying the terminal procedure images as one or more of text, icon, and map images.

* * * * *